US006105228A

United States Patent [19]

Ishii

[11] Patent Number: 6,105,228

[45] Date of Patent: Aug. 22, 2000

[54] TIP COIL WINDER

[75] Inventor: Hiroyuki Ishii, Urawa, Japan

[73] Assignee: Nittoku Engineering Co., Ltd., Saitama-Ken, Japan

[21] Appl. No.: 09/011,569

[22] PCT Filed: May 9, 1997

[86] PCT No.: PCT/JP97/01554

§ 371 Date: Feb. 9, 1998

§ 102(e) Date: Feb. 9, 1998

[87] PCT Pub. No.: WO97/43773

PCT Pub. Date: Nov. 20, 1997

[30] Foreign Application Priority Data

May 13, 1996 [JP] Japan .................................... 8-118044

[51] Int. Cl.[7] .............................. B23Q 7/02; H01F 41/06

[52] U.S. Cl. ........................... 29/33 J; 29/605; 140/92.2; 242/439; 242/448

[58] Field of Search .................................... 29/605, 33 M, 29/33 J, 33 R; 242/448, 439, 533.4, 440, 434.9, 472.6, 443.1, 432.36; 140/92.1, 92.2

[56] References Cited

U.S. PATENT DOCUMENTS 3,667,118 6/1972 Camardella ........................ 140/92.1 X
3,865,152 2/1975 Camardella ........................... 29/605 X
3,938,748 2/1976 Camardella ............................. 242/440
4,055,310 10/1977 Bonaiti .................................... 242/440
4,121,627 10/1978 Schmid ................................. 140/92.1
4,746,075 5/1988 Hoxit ................................. 242/440 X

FOREIGN PATENT DOCUMENTS 4368108 12/1992 Japan ...................................... 29/605
5-79931 10/1993 Japan .
5-315179 11/1993 Japan .

*Primary Examiner*—William Briggs
*Attorney, Agent, or Firm*—Pearne & Gordon LLP

[57] ABSTRACT

The present invention comprises a conveying means having a rotator and a chuck positioned on a rim of this rotator, wherein said chuck clasps a tip core, formed with electrodes at both ends, in a direction parallel to the line along which the electrodes lie, and the conveying means moves the tip core within a fixed plane of rotation; and a winding means, provided neighboring the periphery of the conveying means, for supplying the tip core to the chuck, making a tip coil by winding wire around the tip core, connecting both ends of the wire to the electrodes, cutting wire wound around the tip core from an external wire source, and removing the tip coil from the chuck, wherein the chuck is formed in such a way that the line along which said electrodes lie is at a fixed angle with regard to the radial axis which is orthogonal to the direction of movement of the tip core within the plane of rotation. Consequently, since the winding means which carries out the wire winding process around the tip core is arranged disposed at the above-mentioned fixed angle with regard to the radial axis, the structure of the device can be made smaller than that of the conventional art in which the tip core is held in such a way that the electrodes lie in a line along the radial axis.

16 Claims, 8 Drawing Sheets

TIP COIL WINDER

FIELD OF THE INVENTION

The present invention relates to a tip coil winder for winding wire around a tip shaped core (tip core).

BACKGROUND OF THE INVENTION

FIG. 1 is a plan view showing an outline of a conventional tip coil winder. In the figure, 1 is an index which comprises a rotator 1*a;* eight chucks 1*b*, for holding tip cores A, provided separated at set intervals on the rim of the rotator 1*a*; and wire holding bar 1*c* which is provided for engaging the wire between each chuck 1*b*. In an index 1 structured in this way, the tip cores A held by chucks 1*b* are given a rotary motion within a fixed plane of rotation by means of the rotation of rotator 1*a* in the direction indicated by arrow X and with point 0 as the center of rotation.

FIG. 2 is a plan view showing details of chuck 1*b*. Chuck 1*b* holds (clasps) tip core A from the sides by means of fixed member $1b_1$ provided on the tip of the chuck 1*b* and moveable member $1b_2$ which is freely openable and closable with regard to the above-mentioned fixed member $1b_1$. The tip core A is formed as a cube, and on one surface thereof tip electrodes a1 and a1 are provided at each end of the winding section a2. Chuck 1*b* holds a tip core A of this type on the sides in a clamped manner in a direction which is orthogonal with regard to the direction X of movement, in other words, in such a way that the electrodes a1 and a1 lie in a line which is parallel to the radial axis L. Reference $1b_3$ indicates a winding pin around which wire is wound prior to the winding of the wire around tip core A, and this winding pin is provided in such a way that the end of the wire with which winding around the tip core A will begin is positioned above the tip electrode a1.

In addition, 2 is a part feeder, 3 is a flyer, 4 is a welding device, 5 is a cutting device, 6 is a wire collection device, and 7 is a tip coil removal device, and these comprise the winding means. Part feeder 2 is for supplying tip cores A to the chucks 1*b*; flyer 3 is for winding wire around the winding section a2 of tip core A which is held in chuck 1*b*; welding device 4 is for heat welding both ends of the wire wound around winding section 2*a* by means of flyer 3 to the above-mentioned tip electrodes a1 and a1; cutting device 5 is for cutting both ends of the above-mentioned wire from the external wire source; wire collection device 6 is for collecting the wire which remains after cutting by means of cutting device 5; and tip coil removal device 7 is for removing the tip coil B formed by winding wire around tip core A in the above-mentioned way from the chuck 1*b*.

In the above-mentioned tip coil winder, because the tip core A is held in such a way that the tip electrodes a1 and a1 lie in a line along the radial axis L, there is a limit to how close each of the devices which make up the wiring means can be to the index 1. Consequently, there is the problem that it is difficult to reduce the size of the tip coil winder. In addition, because the wire is wound around winding pin $1b_3$, it is necessary for the flyer 3 to be structured in such a way that it can move in all three axis, i.e. the X axis, the Y axis and the Z axis, and as a result there is the problem that the structure of the device is complicated. Furthermore, when heat welding both ends of the wire which has been wound around the tip core to the electrodes, there is the problem that the wire loosens, and there is also the problem that it is not possible to reliably heat weld because of the adhesion of oxides to the surface of the welding plate which applies heat to the wire and electrodes.

DISCLOSURE OF THE PRESENT INVENTION

In view of the above-mentioned problems, the present invention has the following as objects:

(1) the provision of a tip coil winder which has a structure which can be miniaturized;

(2) the provision of a tip coil winder which has a structure which can be simplified without cost;

(3) the provision of a tip coil winder which is able to prevent the wire which has been wound around the tip core from loosening;

(4) the provision of a tip coil winder which is able to reliably heat weld the wire which has been wound around the tip core to the electrodes; and (5) the provision of a tip coil winder which is able to reliably cut the wire which has been wound around the tip core from the external wire source.

In order to achieve the above objects, the present invention comprises a conveying means having a rotator and a chuck positioned on a rim of this rotator, wherein the above-mentioned chuck clasps a tip core, having electrodes at both ends, from the sides and parallel to the line along which said electrodes lie, and said conveying means moves said tip core within a fixed plane of rotation; and a winding means, provided neighboring the periphery of the above-mentioned conveying means, for supplying the above-mentioned tip core to the above-mentioned chuck, making a tip coil by winding wire around the above-mentioned tip core, connecting the ends of this wire to the above-mentioned electrodes, cutting the wire wound around the above-mentioned tip core from an external wire source and removing the above-mentioned tip coil from said chuck, wherein said chuck is formed in such a way that the above-mentioned line along which said electrodes lie is at a fixed angle with regard to the radial axis which is orthogonal to the direction of movement of the above-mentioned tip cores within the above-mentioned plane of rotation.

By means of the present invention in which this type of structure is adopted, since it is possible for the winding means, which is provided neighboring the periphery of the conveying means and which carries out the winding processes on the tip core, to be arranged at the above-mentioned fixed angle with regard to the radial axis, it possible for the winding means to be brought nearer to the conveying means compared with the conventional situation in which the tip core is held in such a way that the electrodes lie in a line along the radial axis. Consequently, it is possible to miniaturize the structure of the device.

In addition, the present invention also adopts a structure comprising a conveying means having a rotator and a chuck positioned on a rim of this rotator, wherein the above-mentioned chuck clasps a tip core having electrodes at both ends from the sides and parallel to the line along which said electrodes lie, and said conveying means moves said tip core within a fixed plane of rotation; and, provided neighboring the periphery of the above-mentioned conveying means, a supply means for delivering tip cores supplied from an outside source to the chuck; a winding device for winding wire around the above-mentioned tip core which is held by the above-mentioned chuck; a welding device for heat welding both ends of the wire, which has been wound around the above-mentioned tip core, to the above-mentioned electrodes; a cutting device for cutting the wire, which has been wound around the above-mentioned tip core, from the external wire source and thereby making a tip coil; and a tip coil removal device which removes the above-mentioned tip coil from the chuck.

BRIEF DESCRIPTION OF THE DRAWINGS

The following figures are for the purpose of better understanding the present invention, and supplement the description of the preferred embodiments of the present invention explained below.

DESCRIPTION OF THE PREFERRED EMBODIMENTS

In the following, embodiments of the tip coil winder according to the present invention will be explained with reference to the above-mentioned figures.

Figure 1:
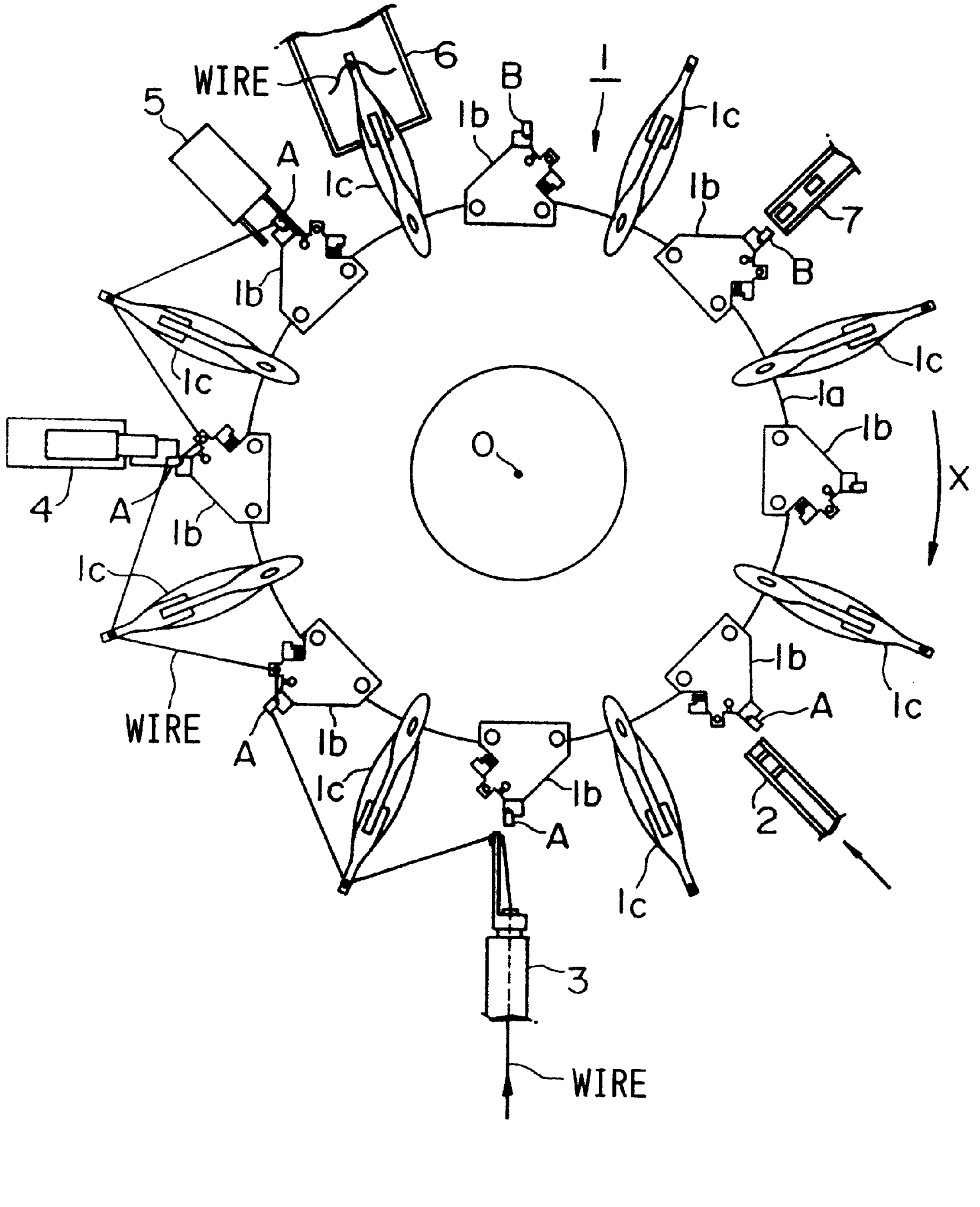
FIG. 1 is a plan view showing an outline of the structure of a conventional tip coil winder.
Figure 2:
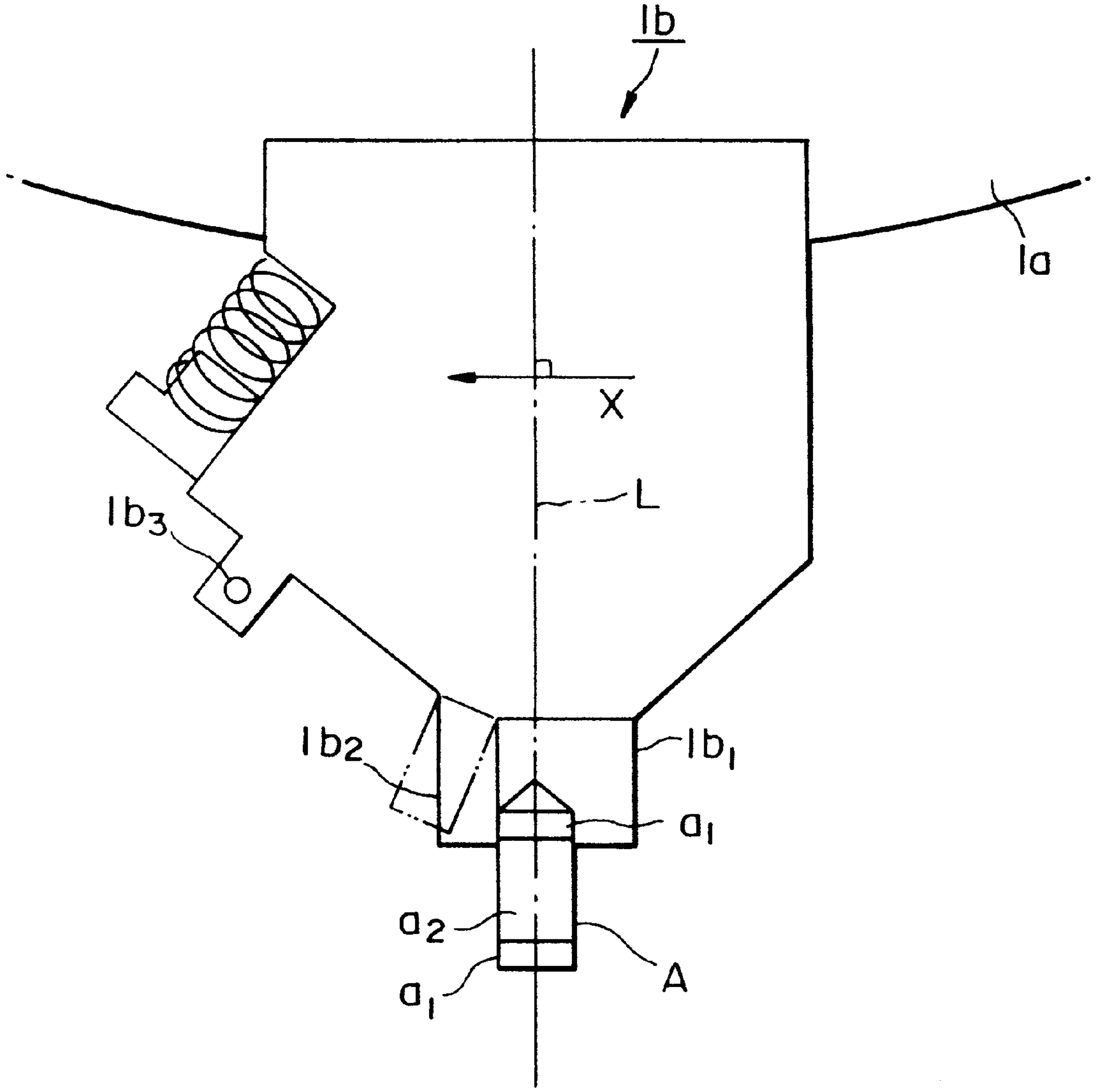
FIG. 2 is a plan view showing the detailed structure of a chuck of a convention tip coil winder.
Figure 3:
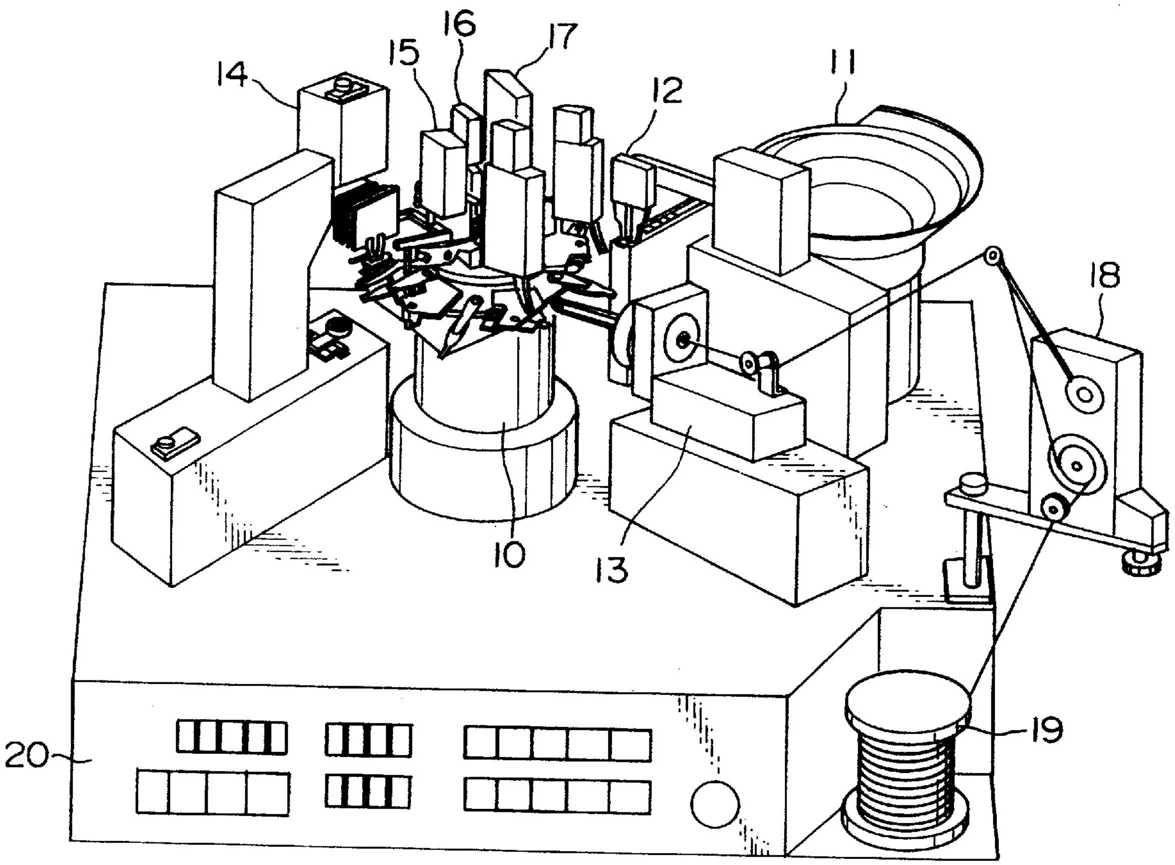
FIG. 3 is a perspective view showing the general structure of a first embodiment of a tip coil winder according to the present invention.

In FIG. 3, reference 10 is an index (conveying means) which holds a tip core A and has rotational movement. Reference 11 is a part feeder which supplies tip cores A to index 10. Reference 12 is an insertion device which delivers the tip cores A to index 10 from part feeder 11. This part feeder 11 and insertion device 12 comprise a supply means.

In addition, reference 13 is a winding device which winds wire around the tip core A held in index 10; reference 14 is a welding device for connecting the wire which has been wound around tip core A to tip electrode a1 by means of heat welding; reference 15 is a cutting device for cutting the wire which has been wound around tip core A from the external wire source; reference 16 is a wire gathering device for gathering the excess wire which remains after being cut by means of cutting device 15; reference 17 is a tip coil removal device for removing the tip coil B formed by winding wire around tip core A, reference 18 is a tension control device for adding constant tension to the wire paid out from bobbin 19 and for supplying wire to the above-mentioned winding device 13; and reference 20 is an operating panel for operating the above-mentioned tip coil winder.

Figure 4:
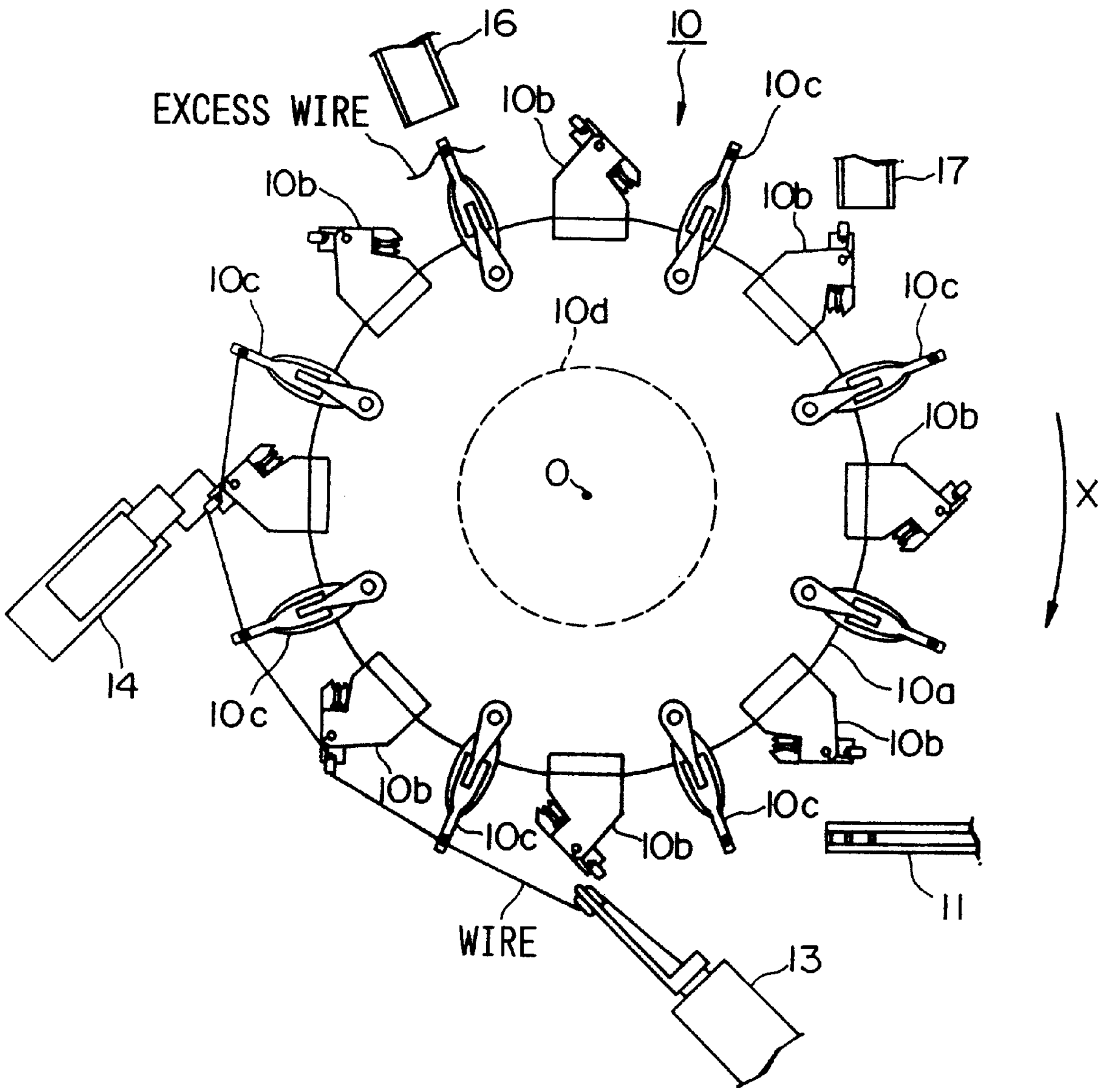
FIG. 4 is a plan view showing the detailed structure of the index of a tip coil winder according to the present invention.

In FIG. 4, reference 10*a* is a disc shaped rotator. Spaced at regular intervals around the rim of this rotator 10*a* are eight chucks 10*b* which are provided in a radiating manner separated by fixed intervals and, between each of these chucks 10*b*, wire holding bars 10*c* (wire holding means) which engage the wire are provided in a radiating manner. These chucks 10*b* are for holding the tip cores A, and wire holding bars 10*c* are for the purpose of clasping the wire.

The above-mentioned rotator 10*a* is provide in the upper section of the index main body 10*d*, and the rotator 10*a* is rotated in the direction indicated by the arrow X around a center of rotation indicated by point 0 by means of a servo-motor provided in this index main body 10*d*. In other words, the rotator 10*a* rotates the tip core A held by the above-mentioned chucks 1*b* in the direction indicated by the arrow X within a fixed plane of rotation.

Tip core A is extremely small and is used in portable telephones, for example, it is formed as a cube having a length of 2.0~2.5 mm, a width of 1.2~2.0 mm and a thickness of 1.2~2.0 mm. In addition, on one surface, tip core A has tip electrodes a1 and a1 (electrodes) provided at each end of winding section a2. The wire used is fine, having a diameter of 0.02~0.08 mm, so that it is possible to increase the number of windings and thereby increase the inductance, and has superior high frequency properties. Tip coils B comprising this type of tip core A and wire are portable telephone tip coils which are superior in high frequency properties at small sizes.

Figure 5:
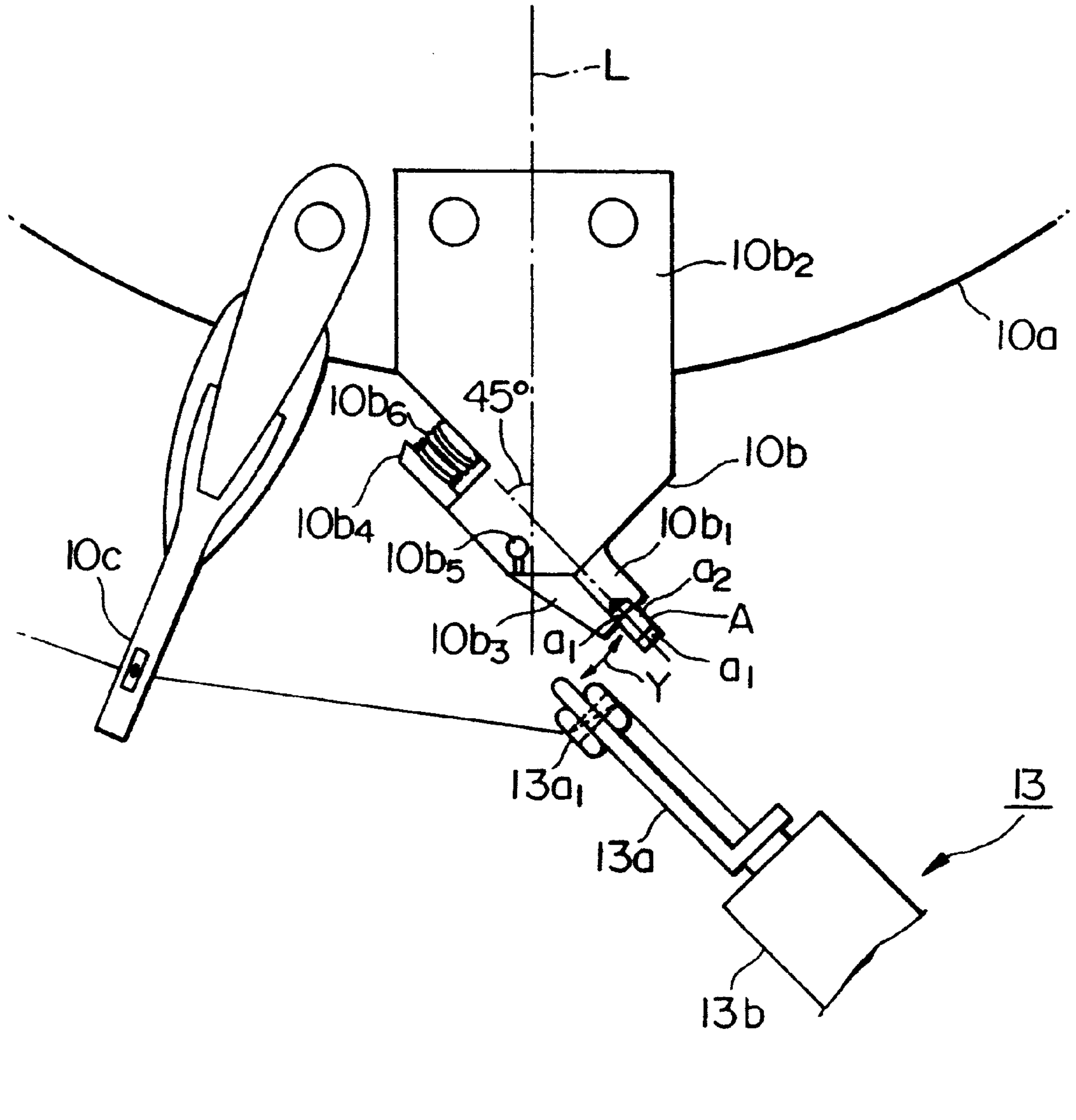
FIG. 5 is a plan view showing the detailed structure of the chuck of a tip coil winder according to the present invention.

In FIG. 5, reference $\mathbf{10}b_1$ is a fixed member provided projecting from chuck main body $\mathbf{10}b_2$, reference $\mathbf{10}b_3$ is a movable member which can be moved open or closed in the direction indicated by arrow Y, with the fulcrum $\mathbf{10}b_5$ at the center, when pushed by pressure applying member $\mathbf{10}b_4$. The above-mentioned chuck 10*b* holds tip core A in such a manner that the line along which the tip electrodes a1 and a1, which are provided at both ends of tip core A, lie is inclined at angle of 45° with regard to the radial axis L.

Reference $\mathbf{10}b_6$ is a spring which lies between the chuck main body $\mathbf{10}b_2$ and pressure applying member $\mathbf{10}b_4$. Tip core A is held between fixed member $\mathbf{10}b_1$ and movable member $\mathbf{10}b_3$ by means of the biasing force of this spring $\mathbf{10}b_6$.

In addition, reference 13*a* is a rod shaped flyer provided on the winding device main body 13*b*, and an aperture $\mathbf{13}a_1$ is provided in the tip of this flyer 13*a* through which wire is threaded. This flyer 13*a* is installed in such a way as to be parallel to the line along which the tip electrodes a1 and a1 lie, in other words at 45° to the radial axis L.

Flyer 13*a* winds wire around the wiring section a2 of tip core A by means of a rotating motion within a plane which is perpendicular to the plane in which the tip electrodes a1 and a1 lie. In this situation, the between the relative positions of the engaging position of the wire on holding bar 10*c* or the length of holding bar 10*c*, and the clasping position of tip core A on chuck 10*b* are adjusted so that both ends of the wire which has been wound around the winding section a2 are positioned above tip electrodes a1.

Figure 6:
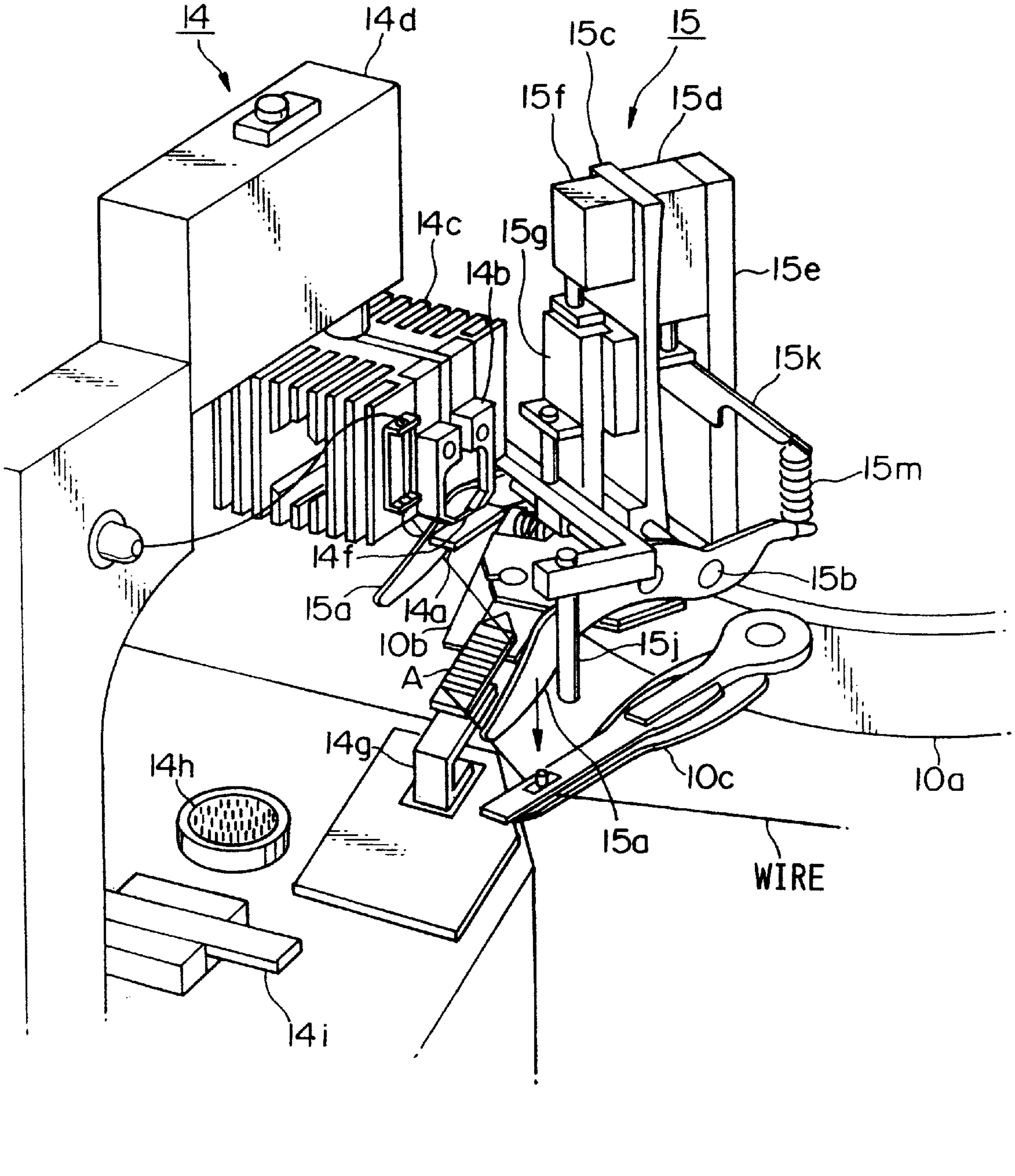
FIG. 6 is a perspective view showing the structure of welding device and the cutting device of a tip coil winder according to the present invention.

In addition, in FIG. 6, reference 14*a* is a welding plate. This welding plate 14*a* is provided in such a way that it can move within the horizontally plane of welding device main body 14*d* with welding electrode 14*b* and heat radiating plate 14*c* or can be raised or lowered, and is such that heating occurs when an electric current flows through the welding electrode 14*b*. This welding plate 14*a* can be moved above tip core A and lowered by means of the operation of welding device main body 14*d*, and applies pressure to the upper surface of tip electrode a1 of tip core A around which wire has been wound by means of the winding device 13. Reference 14*f* is a temperature sensor which detects the temperature of the above-mentioned welding plate 14*a*.

Reference 14*g* is a supporting stand, and is provided on welding device main body 14*d* in such a way that it can be raised and lowered. By raising this supporting stand 14$g$, it comes into contact with the bottom surface of tip core A and supports tip core A from below.

In addition, a contact pressure force adjusting means lies in between the above-mentioned welding electrode 14$b$ and heat radiation plate 14$c$. This contact pressure force adjusting means is formed from, for example, a spring which is inserted between the welding electrode 14$b$ and the heat radiating plate 14$c$, and an adjusting screw which pushes this spring from the heat radiating plate 14$c$ side. In the contact pressure force adjusting means, the pressure applied to the spring is adjusted by means of varying the position of the tip of the adjusting screw by rotating the adjusting screw, and thereby the force of the pressure applied to the tip core A due to welding plate 14$a$ is adjusted.

There is also a contact pressure force adjusting means lying between the supporting stand 14$g$ and the welding device main body 14$d$. This contact pressure force adjusting means is formed by a spring which lies between the supporting stand 14$g$ and the welding device main body 14$d$, and an adjusting screw which pushes this spring from the welding device main body 14$d$ side. In the contact pressure force adjusting means, the pressure applied to the spring is adjusted by means of varying the position of the tip of the adjusting screw by rotating the adjusting screw, and thereby the force of the pressure applied to the tip core A on the support stand is adjusted.

Reference 14$h$ is a brush and reference 14$i$ is a file. This brush 14$h$ and file 14$i$ are cleaning means for cleaning the bottom surface of the above-mentioned welding plate 14$a$, in other words, the surface which makes contact with the tip electrodes a1.

Figure 7:
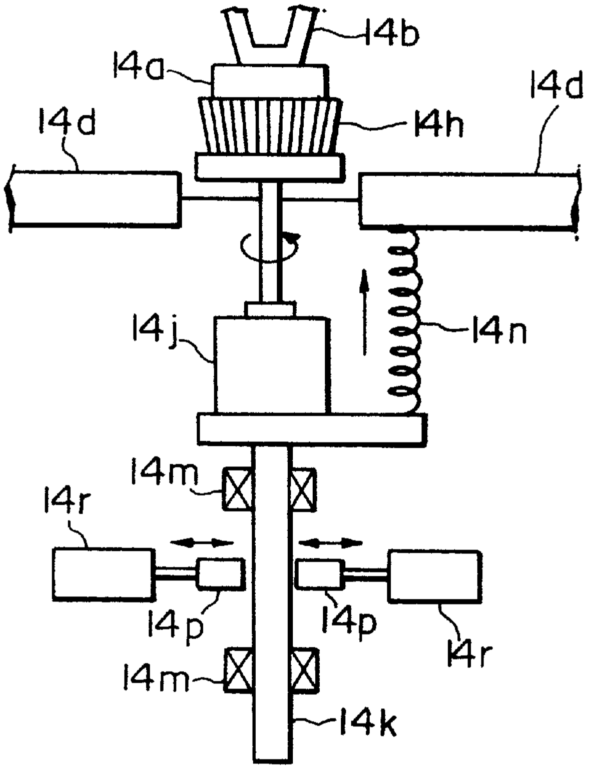
FIG. 7 is an outline showing the structure of a brush cleaning means of a tip coil winder according to the present invention.

As shown in FIG. 7, the brush 14$h$ is such that it is rotated by means of, for example, a motor 14$j$. This motor 14$j$ is supported by the welding device main body 14$d$ by means of supporting member 14$m$ through supporting axle 14$k$ in such a manner that brush 14$h$ can be moved freely up and down, and such that it can be pulled upward by means of spring 14$n$. In addition, on the periphery of the above-mentioned supporting axle 14$k$, a stop cylinder 14$r$ is provided which has a moveable rod 14$p$ which is positioned facing supporting axle 14$k$.

In more detail, when the welding plate 14$a$ is moved above brush 14$h$ by means of the movement of the welding device main body 14$d$, moveable rod 14$p$ is moved away from supporting axle 14$k$ by means of the operation of the stop cylinder 14$r$, and supporting axle 14$k$ is put in to a condition in which it can be freely raised and lowered. As a result, brush 14$h$ is pulled upward by means of the contractile force of spring 14$n$, and applies pressure to welding plate 14$a$. In addition, movable rod 14$p$ applies pressure to supporting axle 14$k$ by means of stop cylinder 14$r$, giving a condition in which the upward and downward movement of supporting axle 14$k$ can be regulated.

In this condition, brush 14$h$ is spun by means of motor 14$j$ and the bottom surface of welding plate 14$a$ is cleaned. By means of adopting this type of structure, even if the brush 14$h$ is worn, it is usually possible for the tip of the brush 14$h$ to apply pressure to the welding plate 14$a$, therefore the contact surface for the tip electrode a1 of the welding plate 14$a$ can be cleaned with certainty.

In addition, (in FIG. 8) cutting device 15 comprises a cut bar indicated by reference 15$a$. Two of these cut bars 15$a$ are arranged such that their tips make contact with the wire which extends on either side of tip core A.

Figure 8:
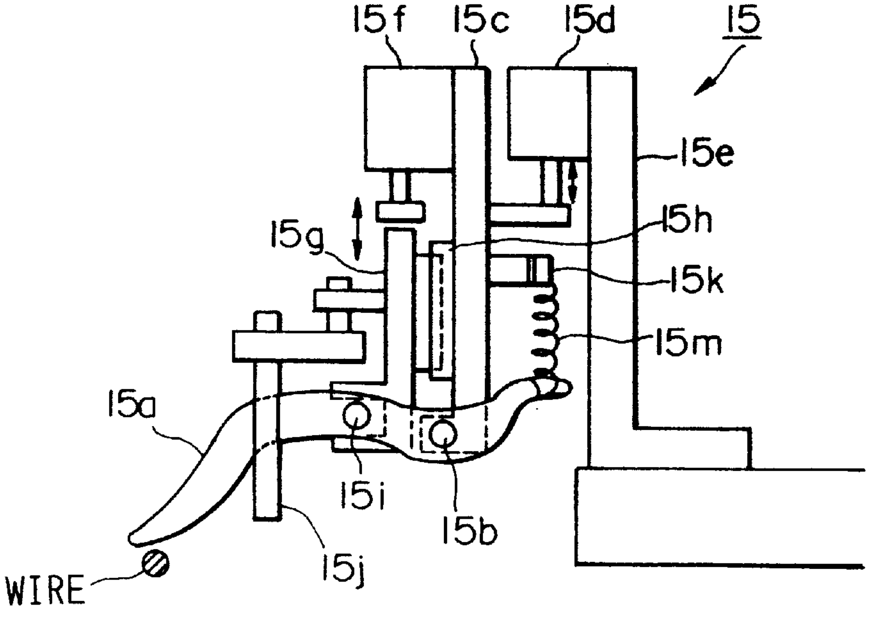
FIG. 8 is a side view showing the structure of the cutting device of a tip coil winder according to the present invention.

As shown in FIG. 8, cut bars 15$a$ are fitted to supporting member 15$c$ in such a way that they rotate within a vertical plane around fulcrum 15$b$. This supporting member 15$c$ is provided on cutting device main body 15$e$ via elevating cylinder 15$d$, and is raised and lowered by means of the operation of elevating cylinder 15$d$, and thereby, cut bars 15$a$ are raised and lowered with regard to the wire. Cutting main body 15$e$ is arranged in a fixed manner.

Cut cylinder 15$f$ is fixed to the above-mentioned supporting member 15$c$. This cut cylinder 15$f$ pushes movable member 15$g$ downward. The linear guide 15$h$ which is fixed to supporting member 15$c$ and movable member 15$g$ is slideable, and when cut cylinder 15$f$ is operated, movable member 15$g$ moves up and down with regard to the supporting member 1$c$. Moveable member 15$g$ is provided in such a manner that it is clasped between the two cut bars 15$a$, and is attached to each of cut bars 15$a$ in such a way that the lower end rotates around fulcrum 15$i$. More specifically, when cut cylinder 15$f$ is operated and movable member 15$g$ is pushed downward, cut bars 15$a$ rotate around fulcrum 15$b$. As a result, the tips of cut bars 15$a$ move downward and apply pressure on the wire.

In addition, pushing arms 15$j$ are fixed to moveable member 15$g$. These pushing arms 15$j$ make contact with each of the wire holding bars 10$c$ on either side of tip core A. In more detail, when cut bars 15$a$ apply pressure on the wire due to the operation of cut cylinder 15$f$, and cut the wire, pushing arms 15$j$ apply pressure to each of the above-mentioned wire holding bars 10$c$ which hold the wire with even greater force.

This cutting of the wire takes place immediately after the wire is welded to each of the tip electrodes a1 by means of the above-mentioned welding device 14. When each of the cut bars 15$a$ is applying pressure on the wire, the strength of the wire at the base section of each of the tip electrodes a1 is reduced by means of heat welding. Consequently, the wire breaks at the base section of these tip electrodes a1 and thereby a completed tip coil B is formed.

In addition, on the cut bars 15$a$, at the rear section which clasps fulcrum 15$b$ opposite the forward section which makes contact with the wire, a spring 15$m$ is positioned between the engaging members 15$k$ which are fixed to the above-mentioned supporting member 15$c$, and at the time of welding, a constant tensile force is applied to the wire due to the weight of the cut bars 15$a$ and the contractile force of the spring 15$m$.

Figure 9:
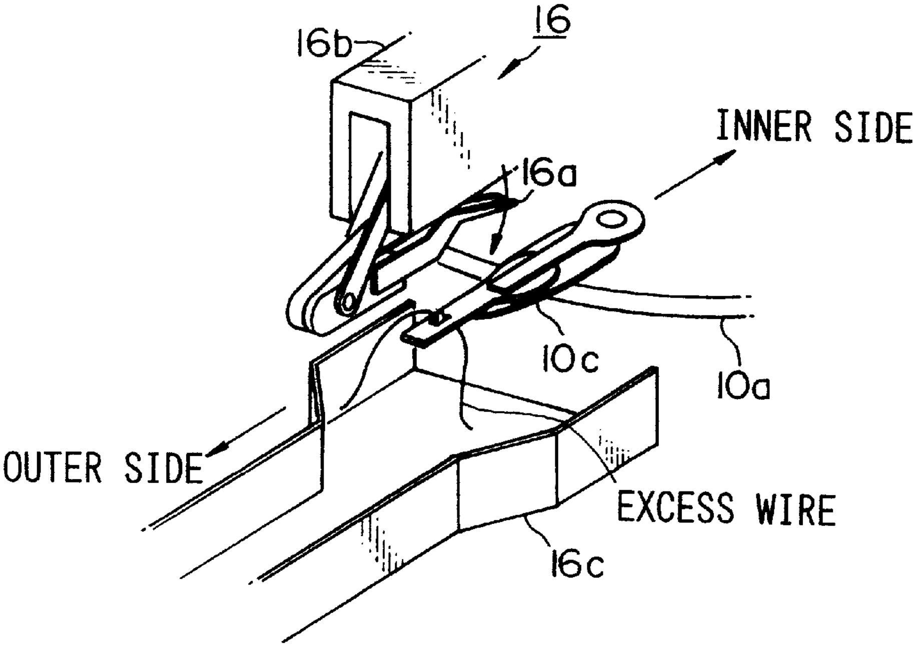
FIG. 9 is a perspective view showing a structure of the wire gathering device of a tip coil winder according to the present invention.

In FIG. 9, reference 16$a$ indicates a wire extracting member which is provided in such a way as to take the wire held in wire holding bar 10$c$ from above. This wire extracting member 16$a$ is fitted to wire gathering device main body 16$b$ in such a way as to have a motion of swinging downward within a vertical plane from above the inner side of the wire holding bar 10$c$ toward the outer side of the wire holding bar 10$c$. By means of the movement of this type of wire extracting member 16$a$, the wire which is engaged in a clasped manner by the wire holding bar 10$c$ can be removed from this wire holding bar 10$c$ and withdrawn to the excess wire gathering passage 16$c$.

Figure 10:
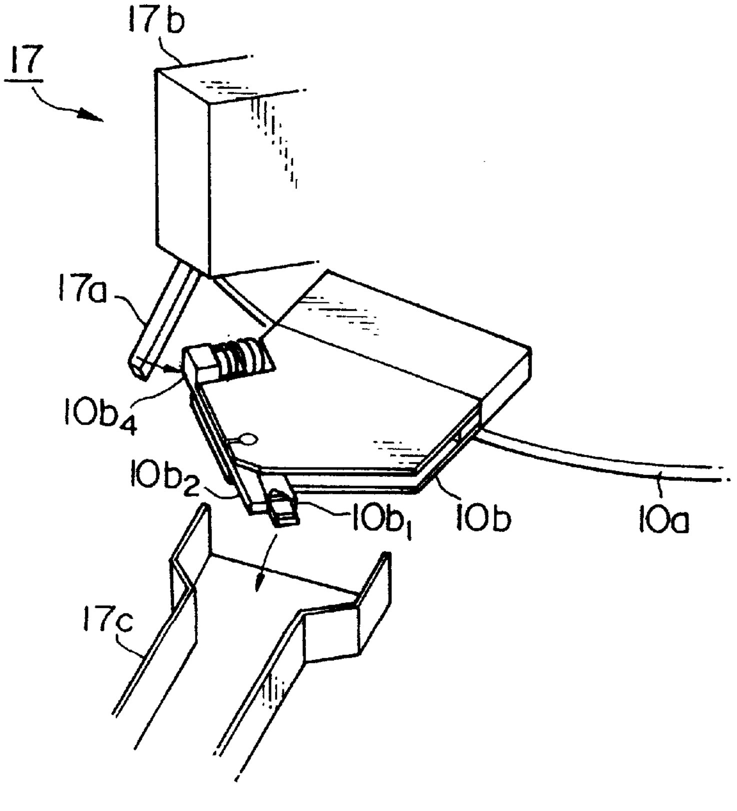
FIG. 10 is a perspective view showing a structure of the tip coil removal device of a tip coil winder according to the present invention.

In FIG. 10, reference 17$a$ is a pressure applying bar. This pressure applying bar 17$a$ is provided on tip coil withdrawal device main body 17$b$ in such a way that it applies pressure on the pressure applying section 10$b_4$ of the above-mentioned chuck 10$b$. Reference 17$c$ is a tip coil removal passage. This tip coil removal passage 17$c$ is for the purpose of removing the tip coils B released by pressure applying bar 17$a$ from the held condition resulting from pressure applied by pressure applying section 10$b_4$.

In the following, the operation of a tip coil winder having the above-mentioned structure will be explained.

Firstly, when a tip core A supplied by part feeder 11 has been inserted via insertion device 12 into chuck 10*b* and held, the rotator 10*a* is rotated in the direction indicated by arrow X. Then wire which has been pulled out from flyer 13*a* becomes engaged, in a clasped manner, in wire holding bar 10*c* which is positioned forward, in the direction of rotation, of this chuck 10*b* in which the above-mentioned tip core A is fitted. At this time, the engagement of the wire by this wire holding bar 10*c* is conducted for example by hand by the operator.

Furthermore, rotator 10*a* is rotated for a fixed angle only in the direction indicated by arrow X, thereby, tip core A is positioned fixed at the tip section of flyer 13*a*, flyer 13*a* is rotated within a plane which is perpendicular to the plain in which the tip electrodes a1 lie, and the wire is wound around winding section a2 for a fixed number of times. Moreover, at the same time as this winding takes place, a new tip core A is installed by means of insertion device 12 into the next chuck 10*b* which is behind, in the direction of rotation, the chuck 10*b* holding the present tip core A.

When the winding of the wire onto tip core A by means of winding device 13 in this way is completed, the rotator 10*a* is rotated for the above-mentioned fixed angle only. Then, the tip core A which is held in the next chuck 10*b* is fixed in a position before the tip section of flyer 13*a*. The wire which extends from this tip core A to the flyer 13*a* by means of the course of movement of this tip core A is engaged by the next wire holding bar 10*c,* and then guided to the next tip core A.

In other words, with this tip coil winder, the rotator 10*a* is rotated intermittently for a fixed angle and tip cores A are successively clasped by chucks 10*b* and winding successively carried out.

Due to the rotation of the rotator 10*a* for the above-mentioned fixed angle for a multiple number of times, tip core A comes to be in a fixed position above supporting stand 14*g* of welding device 14. Here, supporting stand 14*g* is raised and comes into contact with the lower surface of tip core A, then welding plate 14*a* is lowered so as to apply pressure to the upper surface of tip core A in a manner such that each end of the wire (winding) which has been wound around winding section a2 is clamped. Then, by means of running a current through welding electrode 14*b*, welding plate 14*a* is heated and the wire at each end of tip core A is heat welded to each of tip electrodes a1.

At this time, based on the heating temperature of the welding plate 14*a* which is detected by means of temperature sensor 14*f*, for example, the length of the time for which the current runs through welding plate 14*a* is controlled.

Moreover, before running a current through welding electrode 14*b*, cut bar 15*a* is moved downward slightly by the operation of elevating cylinder 15*d*, and the tip of cut bar 15*a* applies pressure on the wire. In this condition, the tension due to the load of the moment of rotation (with fulcrum 15*b* at the center) based on the free weight of the cut bar 15*a* and the contractile force of spring 15*d* is applied to the wire, and loosening of the wire (winding) which has been wound around tip core A is prevented.

In addition, welding plate 14*a* is automatically moved over brush 14*h* or file 14*i* between the intermittent welding treatments as described above, and the contact surface for the tip electrodes a1 is cleaned by means of this brush or file. For example, since brush 14*h* is rotated by means of the above-mentioned motor 14*j* and cleans the contact surface of welding plate 14*a*, the heat of welding plate 14*a* is very effectively transmitted to tip electrode a1 and the wire, and heat welding is reliably conducted.

When the connection of the tip electrodes a1 of both ends of the wiring is completed in this way, the wire holding bars 10*c* on both sides of tip core A apply pressure resulting from pushing arms 15*j,* and loosening of the wire is prevented. At this time, the tips of cut bars 15*a* apply pressure to the wire by moving downward, the wire breaks from the base section of the tip electrodes a1, and thereby the tip coil B is formed. In this condition, the excess wire is held by the wire holding bar 10*c* which is forward of this tip coil B. This excess wire is removed to the excess wire removing passage 16*c* at the next rotation of rotator 1*a* by wire removing device 16. Then, the rotator 1*a* is rotated an additional time and tip coil B is removed to the tip coil removal passage 17*c* by means of tip coil removal device 17.

A tip coil winder such as the one described above, gives results like the following.

(1) Since a plurality of chucks and wire holding means which engage the wire in a clasped manner are arranged in a radiating manner mutually separated at fixed intervals on the periphery of a conveying means, and since the movement of the tip core by means of the conveying means, and the winding of the tip core and the engagement of the wire on the wire holding means occur alternately, it is possible to position both ends of the wire, which has been wound around the tip core, above the electrodes based on the relative positions of the engagement position of the wire on the wire holding device and the clasping position of the tip core by the chuck. Consequently, because it is not necessary to wind the wire by moving the winding pin provided on the chuck in three axes so as to arrange both ends of the above-mentioned wire above the electrode, it is possible to simplify the structure of the wire winding means, and thereby it is possible to reduce costs.

(2) Since both ends of the wire which has been wound around the tip core are connected to electrodes by means of heat welding, it is possible to connect both ends of the wire to the electrodes in a short amount of time.

(3) During the heat welding time, since tension is applied to the wire, it is possible to prevent the wire which is wound around the tip core from loosening.

(4) Since contact pressure force adjusting means for adjusting the contact pressure force applied to the wire are provided on the welding plate and the supporting plate, it is possible to adjust the pressure contact force applied to the tip core and more specifically to the electrodes.

(5) Since a cleaning means for cleaning the surface of the welding plate is provided, it is possible to remove material which has adhered to the surface of the electrode plate as a result of welding, and it is possible to secure both ends of the winding and weld the electrodes.

(6) Since the cut bars apply pressure to the wire immediately after heat welding by the heat welding device, the cut bars apply pressure to the wire while the wire is in a heated condition. Consequently, the wire which is wound around the tip core and the external wire are cut at the base of the electrode where the strength of the wire is reduced due to heating.

What is claimed is:

1. A tip coil winder comprising:

a conveying means having a rotator and a chuck positioned on a rim of said rotator, wherein said chuck clasps a tip core, having electrodes at both ends, from the sides and parallel to a line along which said electrodes lie, and said conveying means moves said tip core within a fixed plane of rotation, and a winding means, provided neighboring the periphery of said conveying means, for supplying said tip core to said chuck, making a tip coil by winding wire around said tip core, connecting ends of said wire to said electrodes, cutting said wire wound around said tip core from an external wire source and removing said tip coil from said chuck, wherein said chuck is formed in such a way that said line along which said electrodes lie is at a fixed angle greater than 0 degrees with regard to a radial axis which is orthogonal to a direction of movement of said tip core within said plane of rotation.

2. A tip coil winder according to claim 1 wherein a plurality of chucks for holding tip cores and a plurality of wire holding means for engaging said wire in a clasping manner are mutually spaced at regular intervals in a radiating manner around a rim of said rotator, and together with the movement of said tip cores, the engagement of said wire in said wire holding means and winding of said wire around said tip cores mutually takes place.

3. A tip coil comprising:

a conveying means having a rotator and a chuck positioned on a rim of said rotator, wherein said chuck clasps a tip core, having electrodes at both ends, from the sides and parallel to a line along which said electrodes lie, and said conveying means moves said tip core within a fixed plane of rotation, and a winding means, provided neighboring the periphery of said conveying means, for supplying said tip core to said chuck, making a tip coil by winding wire around said tip core, connecting ends of said wire to said electrodes, cutting said wire wound around said tip core from an external wire source and removing said tip coil from said chuck, wherein said chuck is formed in such a way that said line along which said electrodes lie is at an angle of 45° with regard to said radial axis.

4. A tip coil winder according to claim 2, further comprising:

a welding device for connecting both ends of said wire, wound around said tip core, to said electrodes by means of heat welding.

5. A tip coil winder comprising:

a conveying means having a rotator and a chuck positioned on a rim of said rotator, wherein said chuck clasps a tip coil, having electrodes at both ends, from the sides and parallel to a line along which said electrodes lie, and said conveying means moves said tip core within a fixed plane of rotation;

a supply means for transferring tip cores supplied from an external source to said chuck, a winding device for winding wire around a tip core held in said chuck;

a welding device for heat welding both ends of said wire wound around said tip core to said electrodes, a cutting device for cutting said wire wound around said tip core from an external wire source and, thereby, making a tip coil; and a tip coil withdrawal device for removing said tip coil from said chuck, wherein said welding device comprises:

a welding plate for applying voltage which applies pressure to said wire which is between said electrodes;

a supporting stand for supporting said electrodes from a side opposite said welding plate; and pressure contact force adjusting means provided on said welding Plate and said supporting stand for adjusting a pressure contact force applied to said wire.

6. A tip coil winder comprising:

a conveying means having a rotator and a chuck positioned on a rim of said rotator, wherein said chuck clasps a tip core, having electrodes at both ends, from the sides and parallel to a line along which said electrodes lie, and said conveying means moves said tip core within a fixed plane of rotation, a winding means, provided neighboring the periphery of said conveying means, for supplying said tip core to said chuck, making a tip coil by winding wire around said tip core, connecting ends of said wire to said electrodes, cutting said wire wound around said tip core from an external wire source and removing said tip coil from said chuck, a welding device for heat welding both ends of said wire wound around said tip core to said electrodes, wherein said chuck is formed in such a way that said line along which said electrodes lie is at a fixed angle greater than 0 degrees with regard to a radial axis which is orthogonal to a direction of movement of said tip core within said plane of rotation, wherein said welding device comprises:

a welding plate for applying voltage which applies pressure to said wire which is between said electrodes;

a supporting stand for supporting said electrodes from a side opposite said welding plate, and pressure contact force adjusting means provided on said welding plate and said supporting stand for adjusting a pressure contact force applied to said wire.

7. A tip coil winder comprising:

a conveying means having a rotator and a chuck positioned on a rim of said rotator, wherein said chuck clasps a tip core, having electrodes at both ends, from the sides and parallel to a line along which said electrodes lie, and said conveying means moves said tip core within a fixed plane of rotation, a winding means, provided neighboring the periphery of said conveying means, for supplying said tip core to said chuck, making a tip coil by winding wire around said tip core, connecting ends of said wire to said electrodes, cutting said wire wound around said tip core from an external wire source and removing said tip coil from said chuck, a welding device for heat welding both ends of said wire wound around said tip core to said electrodes, wherein said chuck is formed in such a way that said line along which said electrodes lie is at a fixed angle greater than 0 degrees with regard to a radial axis which is orthogonal to a direction of movement of said tip core within said plane of rotation, and wherein tension is added to said wire by applying pressure to said wire during heat welding by means of said welding device.

8. A tip coil winder according to claim 5 comprising:

a cleaning means for cleaning a surface of said welding plate.

9. A tip coil winder according to claim 6 further comprising:

a cleaning means for cleaning a surface of said welding plate.

10. A tip coil winder according to claim 7 wherein said wire wound around said tip core is cut from said external wire source by means of said cut bar applying pressure to said wire immediately after heat welding by means of said heat welding device.

11. A tip coil winder according to claim 5 wherein tension is added to said wire by applying pressure to said wire during heat welding by means of said welding device.

12. A tip coil winder according to claim 9 comprising:

a cut bar for cutting said wire wound around said tip core from said external wire source by means of applying pressure to said wire, wherein tension is applied to said wire by means of a load of moment due to a free weight of said cut bar.

13. A tip coil winder according to claim 7 comprising:

a cut bar for cutting said wire wound around said tip core from said external wire source by means of applying pressure to said wire, wherein tension is applied to said wire by means of a load of moment due to a free weight of said cut bar.

14. A tip coil winder according to claim 12 wherein said wire wound around said tip core is cut from said external wire source by means of said cut bar applying pressure to said wire immediately after heat welding by means of said heat welding device.

15. A tip coil winder according to claim 13 wherein said cut bar is provided freely rotatable within a vertical plane around a fulcrum, and said wire wound around said tip core is cut from said external wire source by a downward movement of tips of said cut bars.

16. A tip coil winder according to claim 10 wherein said cut bar is provided freely rotatable within a vertical plane around a fulcrum, and said wire wound around said tip core is cut from said external wire source by the downward movement of tips of said cut bars.

* * * * *

UNITED STATES PATENT AND TRADEMARK OFFICE

CERTIFICATE OF CORRECTION

PATENT NO. : 6,105,228

DATED : August 22, 2000

INVENTOR(S) : Ishii

It is certified that error appears in the above-identified patent and that said Letters Patent is hereby corrected as shown below:

Column 6, line 13, delete "1c" and insert --15c--.

Column 10, line 4, delete "Plate" and insert --plate--.

Column 11, line 3, delete "7" and insert --12--.

Column 12, line 3, delete "12" and insert --11--.

Column 12, line 14, delete "10" and insert --14--.

Signed and Sealed this

Twenty-ninth Day of May, 2001

*Attest:*

Nicholas P. Godici

NICHOLAS P. GODICI

*Attesting Officer*

*Acting Director of the United States Patent and Trademark Office*